(12) United States Patent
Arizono et al.

(10) Patent No.: US 9,443,175 B2
(45) Date of Patent: Sep. 13, 2016

(54) COLOR CONVERTING APPARATUS AND A COLOR CONVERTING METHOD

(71) Applicant: SCREEN Holdings CO., LTD., Kyoto (JP)

(72) Inventors: Shigenori Arizono, Kyoto (JP); Kohei Ueda, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 14/723,439

(22) Filed: May 27, 2015

(65) Prior Publication Data

US 2016/0026905 A1 Jan. 28, 2016

(30) Foreign Application Priority Data

Jul. 22, 2014 (JP) ................. 2014-148625

(51) Int. Cl.
*H04N 1/60* (2006.01)
*G03F 3/08* (2006.01)
*G06K 15/02* (2006.01)
*H04N 1/52* (2006.01)
*H04N 1/54* (2006.01)

(52) U.S. Cl.
CPC ............ *G06K 15/1881* (2013.01); *H04N 1/52* (2013.01); *H04N 1/54* (2013.01); *H04N 1/60* (2013.01)

(58) Field of Classification Search
None
See application file for complete search history.

(56) References Cited

U.S. PATENT DOCUMENTS

| | | | | |
|---|---|---|---|---|
| 5,241,396 A * | 8/1993 | Harrington | | H04N 1/56 358/296 |
| 5,526,140 A * | 6/1996 | Rozzi | | H04N 1/6011 358/535 |
| 6,559,975 B1 * | 5/2003 | Tolmer | | H04N 1/56 358/1.9 |
| 6,943,915 B1 | 9/2005 | Teraue | | |
| 7,408,673 B1 * | 8/2008 | Chinn | | G01J 3/02 345/593 |
| 8,385,635 B2 * | 2/2013 | Matsuo | | H04N 1/52 358/536 |
| 8,462,386 B2 * | 6/2013 | Dalal | | G01J 3/46 356/402 |
| 8,958,081 B2 * | 2/2015 | Gil | | H04N 1/6022 358/1.13 |
| 2003/0058477 A1 * | 3/2003 | Brunk | | G06K 15/02 358/3.28 |
| 2003/0095271 A1 * | 5/2003 | Falk | | G06K 15/02 358/1.9 |

(Continued)

FOREIGN PATENT DOCUMENTS

| | | |
|---|---|---|
| JP | 2000-217007 A | 8/2000 |
| JP | 2001-157074 A | 6/2001 |

*Primary Examiner* — Madelein Nguyen
(74) *Attorney, Agent, or Firm* — McDermott Will & Emery LLP

(57) ABSTRACT

As image processing apparatus includes a color converter 20 as a color converting device. The color converter 20 has, as main functional components for carrying out color conversion of halftone of a spot color, a spot color information acquiring unit 21 for acquiring spot color information from manuscript data, a spot color Lab acquiring unit 22 for acquiring L*a*b* values in an L*a*b* color space when the dot percentage of the spot color is 100%, a first calculating unit 23 for calculating halftone L*a*b* values, using the L*a*b* values at 100% dot percentage of the spot color acquired by the spot color Lab acquiring unit 22 and a dot percentage of the spot color in a printing target portion of the spot color, and a second calculating unit 24 for converting, using an output ICC profile, the halftone L*a*b* values calculated by the first calculating unit 23 into CMYK values.

6 Claims, 9 Drawing Sheets

(56) References Cited

U.S. PATENT DOCUMENTS

| | | | |
|---|---|---|---|
| 2004/0190031 A1* | 9/2004 | Fujita | H04N 1/52 358/1.9 |
| 2004/0223172 A1* | 11/2004 | Yoshizawa | H04N 1/54 358/1.8 |
| 2005/0007608 A1* | 1/2005 | Yamamoto | H04N 1/6033 358/1.9 |
| 2005/0052666 A1* | 3/2005 | Yamamoto | H04N 1/54 358/1.9 |
| 2005/0068585 A1* | 3/2005 | Shimizu | H04N 1/6052 358/2.1 |
| 2005/0094169 A1* | 5/2005 | Berns | H04N 1/6033 358/1.9 |
| 2005/0094871 A1* | 5/2005 | Berns | H04N 1/6033 382/162 |
| 2005/0206925 A1* | 9/2005 | Agehama | G06K 15/02 358/1.9 |
| 2005/0226498 A1* | 10/2005 | Lee | H04N 1/405 382/162 |
| 2005/0243374 A1* | 11/2005 | Nishide | H04N 1/56 358/2.1 |
| 2007/0121131 A1* | 5/2007 | Hauser | G06K 15/02 358/1.9 |
| 2008/0043271 A1* | 2/2008 | Gil | H04N 1/6033 358/1.9 |
| 2009/0009766 A1* | 1/2009 | Bonino | G01J 3/02 356/402 |
| 2009/0296113 A1* | 12/2009 | Mestha | H04N 1/62 358/1.9 |
| 2010/0079813 A1* | 4/2010 | Bernal | H04N 1/393 358/3.06 |
| 2010/0157393 A1* | 6/2010 | Qiao | H04N 1/6058 358/500 |
| 2010/0157397 A1* | 6/2010 | Qiao | H04N 1/6058 358/518 |
| 2010/0158359 A1* | 6/2010 | Qiao | G06K 9/4652 382/164 |
| 2010/0165364 A1* | 7/2010 | Qiao | H04N 1/603 358/1.9 |
| 2011/0013207 A1* | 1/2011 | Chauvin | H04N 1/56 358/1.9 |
| 2011/0149312 A1* | 6/2011 | Mestha | G01J 3/46 358/1.9 |
| 2012/0106835 A1* | 5/2012 | Bernal | H04N 1/52 382/162 |
| 2014/0056617 A1* | 2/2014 | Rimai | G03G 15/224 399/130 |
| 2015/0093149 A1* | 4/2015 | Tyagi | B41M 3/16 399/130 |
| 2015/0098099 A1* | 4/2015 | Matsumoto | H04N 1/6008 358/1.9 |
| 2015/0156369 A1* | 6/2015 | Reed | H04N 1/32309 382/100 |
| 2015/0332132 A1* | 11/2015 | Inamura | G06K 15/1878 358/1.9 |
| 2015/0339552 A1* | 11/2015 | Deshpande | G06K 15/1867 358/1.9 |
| 2016/0198064 A1* | 7/2016 | Bai | H04N 1/32309 382/100 |

* cited by examiner

COLOR CONVERTING APPARATUS AND A COLOR CONVERTING METHOD

RELATED APPLICATIONS

This application claims the benefit of Japanese Application No. 2014-148625, filed on Jul. 22, 2014, the disclosures of which Applications are incorporated by reference herein.

BACKGROUND OF THE INVENTION

1. Field of the Invention

This invention relates to a color converting apparatus and a color converting method for use with a printing machine when making color prints.

2. Description of the Related Art

In a printing system which carries out digital color printing, a different color definition is used for each of a display device such as a liquid crystal display for displaying images, a scanner for reading images, and a printing machine for performing printing. A color management for controlling printing colors of the printing machine is carried out by converting such different color definition for each digital device into a common color expression using ICC profiles. The ICC profiles are files of formats specified by the International Color Consortium, and are files defining characteristics of the color spaces of devices. These ICC profiles employ the CIE color system (CIEXYZ, CIELAB) as a common color display method.

A color printing machine performs printing, using the four color materials of cyan (C), magenta (M), yellow (Y) and black (K) which are generally called process colors. On the other hand, for colors difficult to express with color reproduction by the process colors, a specially color-mixed monochromatic ink or toner is prepared and is loaded in the printing machine as spot color (special color). A printing machine particularly suited for mass printing of a single article, such as package printing with a corporate color in large quantities, carries out color printing with a spot color designated as the corporate color, besides the process colors.

Incidentally, for POD (Print On Demand) printing which specializes in multi-article and small number of copies printing, since this prints only a required number of copies when required, a spot color cannot in many cases be loaded in the printing machine. Therefore, in POD printing, a spot color has to be reproduced by means of the process colors used in for printing.

When the printing ink colors used by the printing machine are the four colors of CMYK, for example, a spot color presented in RGB values on the display device will be expressed as separated into CMYK values in a printing color space. In conventional color reproduction of a spot color, the operator determines, for a solid portion of the spot color, CMYK values based on values obtained by measuring color samples or prints with a colorimetric machine. Other varied measures taken include a case of the operator selecting, from among color patches of a printed color chart, the color patch closest to the spot color displayed on the display device. A proposal has been made in Japanese Unexamined Patent Publication No. 2000-217007, according to which a color chart consisting of 27 color patches is printed, and the operator selects from the color chart the color patch closest to a spot color displayed on a display device, thereby realizing a color conversion with a high degree of approximation in color sense between the spot color displayed on the display device and the color outputted by a printing machine.

A further proposal has been made in Japanese Unexamined Patent Publication No. 2001-157074, according to which, when proof printing is carried out with a printing machine not loaded with a spot color for prior confirmation of the result of printed image in advance of printing by a printing machine loaded with the spot color, image data is generated for the proof printing by combining CMYK process colors and the spot color after color conversions are carried out with different conversion systems, respectively.

A further description will be made of a relationship between $L^*a^*b^*$ values in a device-independent $L^*a^*b^*$ color space, which are employed as conventional common color expression between devices, and CMYK values in a printing color space dependent on the colors of color materials of a printing machine. FIG. 9 is a graph showing a relationship between a monochromatic dot percentage and $L^*a^*b^*$ values. FIG. 10 is a graph showing hue variations in an $a^*-b^*$ plane occurring with variations in the monochromatic dot percentage. FIGS. 9 and 10 show a plotting of each value when the dot percentage is changed at intervals of 10%.

The relationship between the dot percentage of single color C used as a process color and $L^*a^*b^*$ values is, as shown in FIG. 9, such that each value of $L^*$, $a^*$ and $b^*$ has a tendency to diminish linearly and substantially equally with the dot percentage. Also the $a^*-b^*$ plane presenting hue, as shown in FIG. 10, changes linearly and at a substantially constant rate with the variations in the dot percentage.

When reproducing the halftone of a spot color with the process colors, according to conventional practice, $L^*a^*b^*$ values of a solid of the spot color (with dot percentage at 100%) provided by a color material supplier such as an ink maker, or $L^*a^*b^*$ values obtained by measuring with a colorimetric machine a solid patch of the spot color printed with a printing machine, are first converted into coordinate values (CMYK values) in a CMYK color space which is a printing color space of the printing machine, using an ICC profile of a printing machine for output. Then, CMYK values of the spot color are calculated based on the CMYK values of the solid of the spot color (with dot percentage at 100%), on an assumption that the CMYK values of the spot color vary linearly with variations in the dot percentage (in a proportional relation therebetween). When, for example, the CMYK values of the solid of the spot color are CMYK= (50, 30, 20, 0), CMYK values of halftone with a dot percentage at 50% are calculated by multiplying the CMYK values of the solid by the 50% halftone dot percentage, which results in CMYK=(25, 15, 10, 0).

As shown in FIGS. 9 and 10, in the case of a single color, each value of $L^*$, $a^*$ and $b^*$ and the hue vary linearly with variations in dot percentage. It is ideal that each value of $L^*$, $a^*$ and $b^*$ of the spot color supplied as a monochromatic color material for a printing machine loadable with the spot color, and hue as well, will change similarly. Conventionally, therefore, even when a spot color is reproduced with the process colors, a technique (conventional technique) is conceivable which calculates halftone CMYK values by multiplying the CMYK values of a solid as they are by a dot percentage, based on an assumption that variations similar to those of a single color will occur with variations in dot percentage.

FIG. 11 is a graph showing a relationship between dot percentage and $L^*a^*b^*$ values of a spot color when the spot color is reproduced with the three colors of CMY by a conventional technique. FIG. 12 is a graph showing hue variations in an $a^*b^*$ plane occurring with variations in the dot percentage when the spot color is reproduced with the three colors of CMY by the conventional technique. FIGS. 11 and 12 show an example of spot color which can be expressed by CMY=(100, 70, 10) when a solid of the spot color is separated into CMY, and show a plotting of each value occurring when the dot percentage is varied at intervals of 10%.

When halftone CMY (K) values are obtained from CMY= (100, 70, 10) with the dot percentage at 100% by the conventional method of calculation giving CMY=(50, 35, 5) if the dot percentage is 50%, each value of L* and b*, as shown in FIG. 11, can be said to vary linearly with variations in the dot percentage, but the value of a* shows a gentle arch form attaining a maximum at 50% dot percentage. In the a*–b* plane, as shown in FIG. 12, the directional property and rate of change with respect to the variations in the dot percentage are not uniform, and linearity is greatly impaired.

Thus, in printing with the CMYK values acquired by the conventional calculation technique, since the hue in the a*–b* plane varies significantly with variations in dot percentage, halftone portions can deviate from envisaged color sense even though color reproduction in a solid portion of a spot color is performed with high accuracy.

SUMMARY OF THE INVENTION

The object of this invention, therefore, is to provide a color converting apparatus and a color converting method which can reproduce halftones of a spot color (special color) with high accuracy when the spot color is reproduced with process colors.

The above object is fulfilled, according to this invention, by a color converting apparatus for converting a device-independent color space into a printing color space dependent on colors used in a printing machine, in color printing in which a spot color unused as a color material for the printing machine is reproduced with a plurality of color materials used in the printing machine, the apparatus comprising a first calculating unit for calculating halftone color values of the spot color in the device-independent color space according to a certain rule represented by a line connecting, in the device-independent color space, maximum color values of a time when a dot percentage of the spot color in the device-independent color space is at a maximum, and minimum color values of a time when the dot percentage of the spot color in the device-independent color space is at a minimum; and a second calculating unit for calculating printing color values in the printing color space from the halftone color values.

According to such color converting apparatus, halftone L*a*b* values after being calculated are converted into CMYK values. It is therefore possible to reproduce halftone color sense of the spot color with increased accuracy by the colors of color materials used in the printing machine.

In one preferred embodiment, the device-independent color space is an L*a*b* color space, and the first calculating unit is arranged to calculate halftone L*a*b* values of the spot color in the L*a*b* color space according to a certain rule represented by a line connecting, in the L*a*b* color space, maximum L*a*b* values of a time when a dot percentage of the spot color in the L*a*b* color space is at a maximum, and minimum L*a*b* values of a time when the dot percentage of the spot color in the L*a*b* color space is at a minimum.

In another preferred embodiment, the first calculating unit is arranged to calculate the halftone L*a*b* values on an assumption that the halftone L*a*b* values are variable by equal ratio with the dot percentage of the spot color, on the line connecting the maximum L*a*b* values and the minimum L*a*b* values in the L*a*b* color space.

In yet another preferred embodiment, the first calculating unit is arranged to calculate the halftone L*a*b* values on an assumption that the halftone L*a*b* values are variable unequally with the dot percentage of the spot color, on the line connecting the maximum L*a*b* values and the minimum L*a*b* values in the L*a*b* color space.

In a further preferred embodiment, the first calculating unit is arranged to calculate the halftone L*a*b* values according to a certain rule represented by a line connecting a*b* values, respectively, of the maximum L*a*b* values and the minimum L*a*b* values on an a*–b* plane in the L*a*b* color space.

Further, according to a different aspect of this invention, a color converting method is provided for converting a device-independent color space into a printing color space dependent on colors used in a printing machine, in color printing in which a spot color unused as a color material for the printing machine is reproduced with a plurality of color materials used in the printing machine, the method comprising a first calculating step for calculating halftone color values of the spot color in the device-independent color space according to a certain rule represented by a line connecting, in the device-independent color space, maximum color values of a time when a dot percentage of the spot color in the device-independent color space is at a maximum, and minimum color values of a time when the dot percentage of the spot color in the device-independent color space is at a minimum; and a second calculating step for calculating printing color values in the printing color space from the halftone color values.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Figure 1:
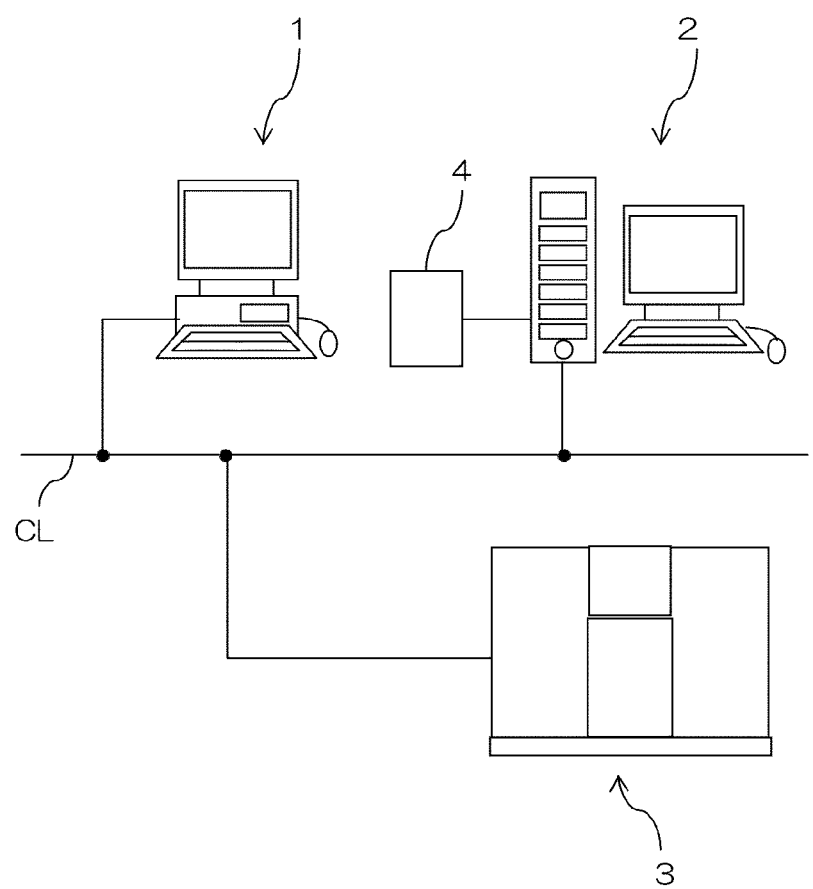
FIG. 1 is a schematic view showing a construction of a printing system including an image processing apparatus as a color converting apparatus according to this invention.

An embodiment of this invention will be described hereinafter with reference to the drawings. FIG. 1 is a schematic view showing a construction of a printing system including an image processing apparatus 2 as a color converting apparatus according to this invention.

This printing system includes a client computer 1 for creating manuscript data by arranging and editing plural types of parts such as characters and pictures which make up prints, a printing machine 3 for executing printing, the image processing apparatus 2 for carrying out a process of generating a color profile (ICC profile) which controls printing colors, a color conversion process using the color profile, a rasterizing process (RIP) for generating print data processable by the printing machine 3, and color conversion to be described hereinafter, and a colorimetric machine 4 connected to the image processing apparatus 2. The client computer 1, data processing apparatus 2 and printing machine 3 can transmit and receive various information to and from one another through a communication line CL connected to a network such as a LAN (Local Area Network).

The printing machine 3 executes printing using the four color materials of cyan (C), magenta (M), yellow (Y) and black (K). The printing machine 3 is what is called a digital printing machine, and may be the inkjet type or electrophotographic type. The color materials in this invention mean inks and toners. Although the printing system of FIG. 1 exemplifies the type that outputs data to a digital printing machine, it may be a printing system that carries out offset printing through a CPT plate maker.

Figure 2:
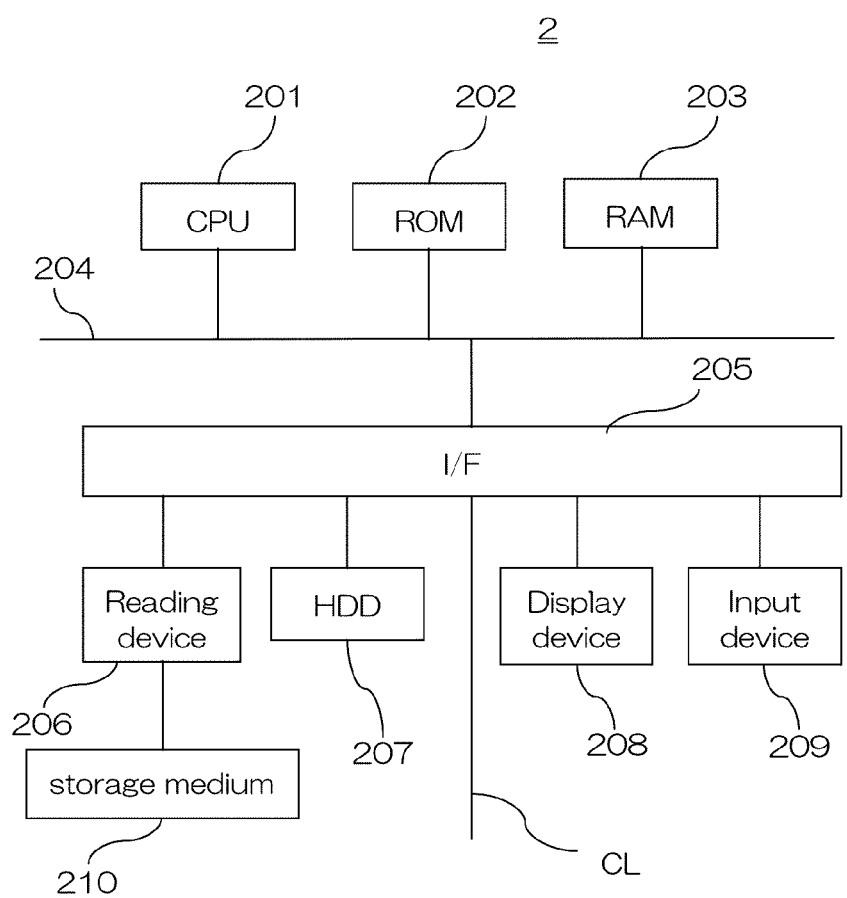
FIG. 2 is a block diagram showing a hardware configuration of the image processing apparatus.

FIG. 2 is a block diagram showing a hardware configuration of the image processing apparatus 2.

The image processing apparatus 2 is realized by using a personal computer, which includes a CPU 201, a ROM 202, a RAM 203, an interface 205, a reading device 206 such as a disk drive for reading information from a portable storage medium 210 such as a CD-ROM, an HDD (hard disk) 207 which is a magnetic disk, a display device 208 such as a liquid crystal display, and an input device 209 such as a keyboard and a mouse.

The CPU 201, ROM 202, RAM 203 and interface 205 are connected to one another through a bus 204. The reading device 206, HDD 207 and communication line CL are connected to the interface 205. The display 208 displays information including various settings in the image processing system 2. The input device 209 is used by the operator in changing the various settings.

The image processing apparatus 2 can communicate with the client computer 1 and printing machine 3 through the communication line CL connected to the interface 205. The HDD 207 stores various data and programs, such as of a spot color (special color) control DB (database) described hereinafter. When a program stored on the HDD 207 is executed, the program is loaded into the ROM 202, and its functions are realized using the RAM 203 and CPU 201.

Figure 3:
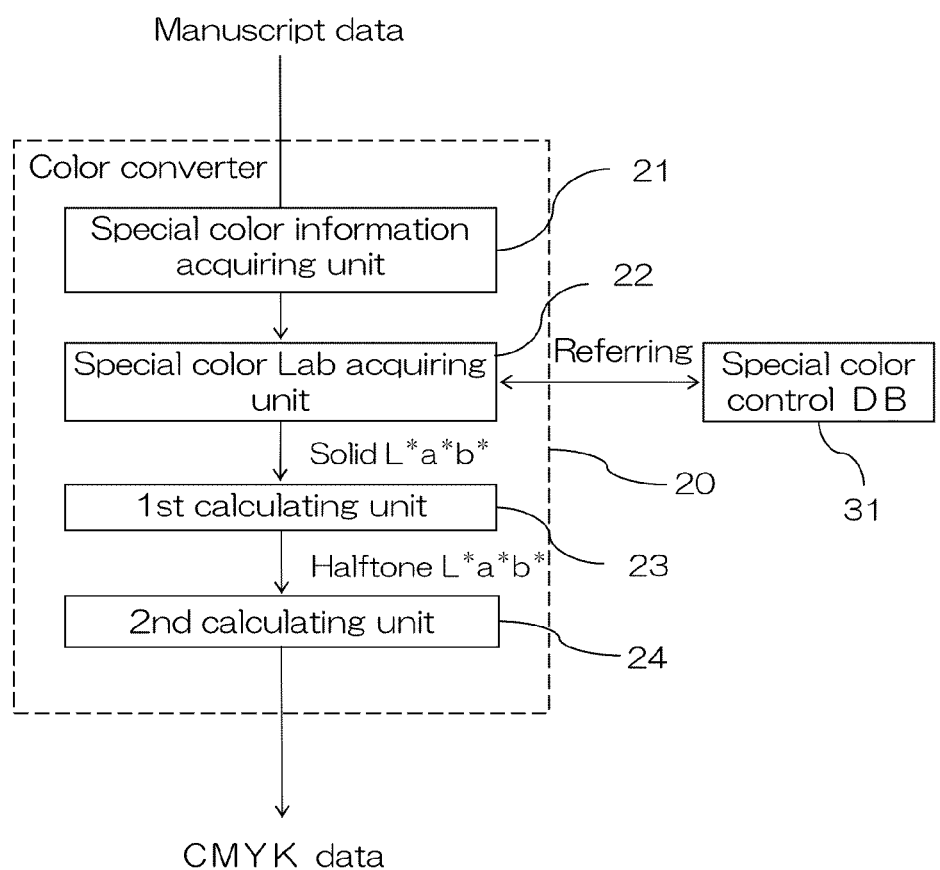
FIG. 3 is a block diagram showing a main functional construction related to color conversion of halftone of a spot color.
Figure 4:
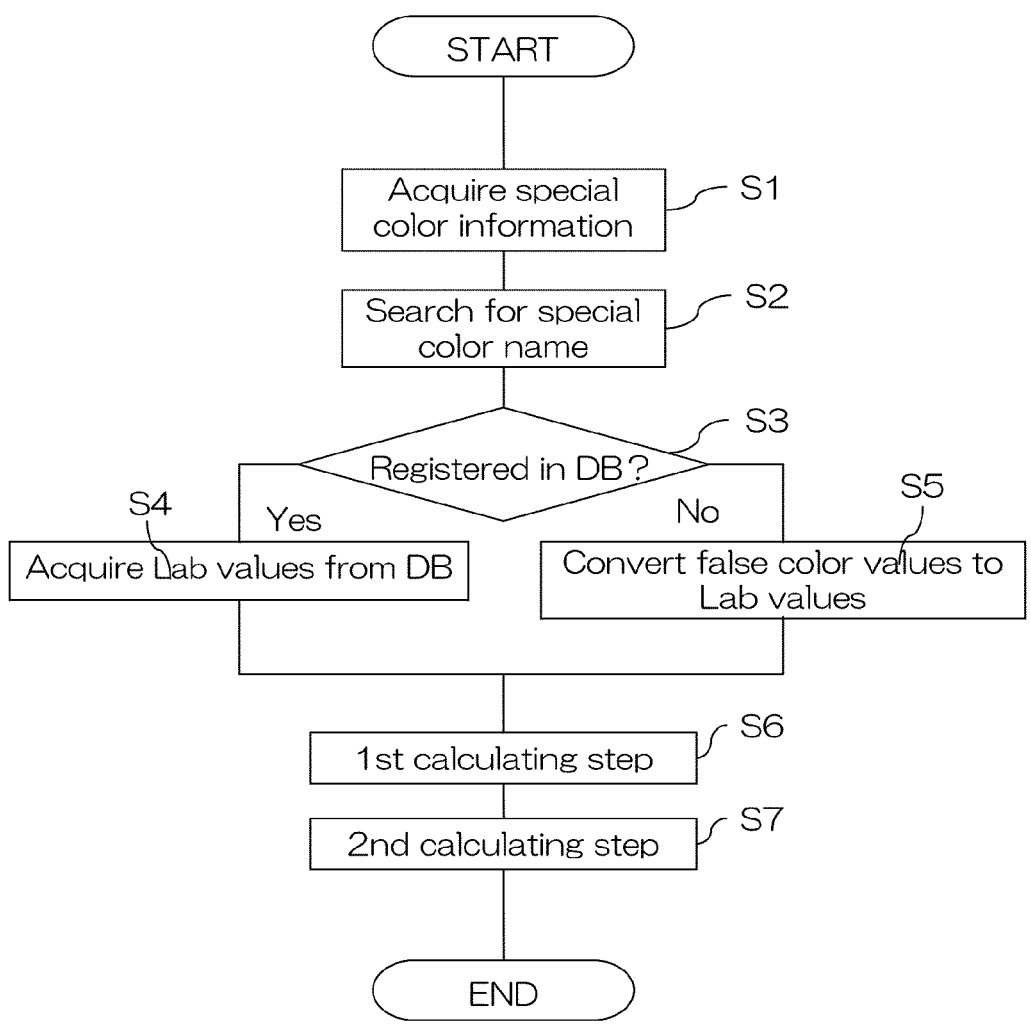
FIG. 4 is a flow chart showing a procedure for the color conversion of halftone of the spot color.

FIG. 3 is a block diagram showing a main functional construction related to color conversion of halftone of a spot color. FIG. 4 is a flow chart showing a procedure for the color conversion of halftone of the spot color. In this embodiment, an L*a*b* color space is employed as device-independent color space.

The image processing apparatus 2 includes a color converter 20 acting as a color converting device. The color converter 20 has, as main functional components for carrying out color conversion of halftone of the spot color, a spot color information acquiring unit 21 for acquiring spot color information from the manuscript data, a spot color Lab acquiring unit 22 for acquiring L*a*b* values (solid L*a*b*) in the L*a*b* color space when the dot percentage of the spot color is at its maximum (100%), a first calculating unit 23 and a second calculating unit 24.

The spot color information acquiring unit 21 acquires spot color information embedded in the manuscript data and including a spot color name and false color values (e.g. CMYK, RGB, etc.) expressing the spot color with key colors in different color systems (step S1). Then, the spot color information acquiring unit 21 searches the spot color control DB 31 by means of the acquired spot color name (step S2). Definitions of the spot color name include, for example, an arbitrary name such as gold, silver, or bright orange, and an ink maker's color number.

As shown in FIG. 4, the spot color Lab acquiring unit 22, when the spot color name is registered in the spot color control DB 31 (step S3), refers to corresponding data in the spot color control DB 31, and acquires L*a*b* values at 100% dot percentage of the spot color (step S4). On the other hand, when the spot color name is not registered in the spot color control DB 31 (step S3), the spot color Lab acquiring unit 22 converts the false color values acquired in step S1 into L*a*b* values using an input ICC profile (step S5) to acquire the L*a*b* values at 100% dot percentage of the spot color.

The first calculating unit 23 calculates halftone L*a*b* values, using the L*a*b* values at 100% dot percentage of the spot color acquired by the spot color Lab acquiring unit 22 and the dot percentage of the spot color in a printing target portion of the spot color (step S6).

The second calculating unit 24, using an output ICC profile, converts the halftone L*a*b* values (halftone L*a*b*) calculated by the first calculating unit 23 into CMYK values which are color values in a printing color space dependent on the colors (four colors of CMYK) used in printing by the printing machine 3 (step S7). Subsequently, CMYK data after the conversion to the CMYK values is outputted. The printing machine 3 carries out printing based on the CMYK data.

Figure 5:
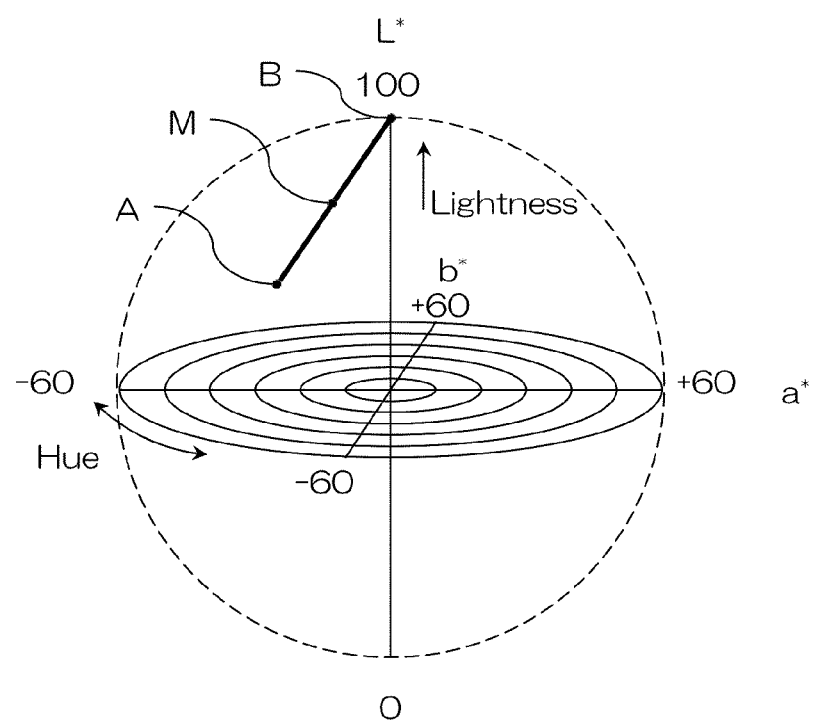
FIG. 5 is an explanatory view of a technique of calculating halftone L*a*b* values in a first calculating unit.

The technique of calculating the halftone L*a*b* values in the first calculating unit 23 will be described in further detail. FIG. 5 is an explanatory view of the technique of calculating the halftone L*a*b* values in the first calculating unit 23.

As shown in FIG. 5, the L*a*b* color space numerically expresses color with an L* axis representing lightness in numerical values of 0-100, and an a* axis and a b* axis representing chromaticity. +a* indicates a direction of red, −a* a direction of green, +b* a direction of yellow, and −b* a direction of blue. This FIG. 5 shows an example in which the coordinate ranges of the a* axis and b* axis are −60 to +60. The first calculating unit 23 calculates halftone L*a*b* values of the spot color in the L*a*b* color space according to a certain rule represented by a line connecting, in the L*a*b* color space, maximum L*a*b* values when the dot percentage of the spot color in the L*a*b* color space is at its maximum, and minimum L*a*b* values when the dot percentage of the spot color in the L*a*b* color space is at its minimum.

The maximum L*a*b* values are L*a*b* values at the time of 100% dot percentage of the spot color acquired by the spot color Lab acquiring unit 22. The minimum L*a*b* values are L*a*b* values obtained by measuring beforehand the ground color of a recording medium with the colorimetric machine 4. In the example shown in FIG. 5, the maximum L*a*b* values and minimum L*a*b* values are shown in points on a 3D space of L*a*b*. The maximum L*a*b* values (point A) are made L*a*b*=(60, −30, 40), and the minimum L*a*b* values (point B) L*a*b*=(100, 0, 0).

The first calculating unit 23 calculates L*a*b* values of the spot color with 50% dot percentage (point M) to be L*a*b*=(80, −15, 20), on an assumption that, in the L*a*b* color space shown in FIG. 5, the L*a*b* values of the spot color vary by equal ratio on the straight line connecting point A and point B in response to variations in the dot percentage of the spot color.

Figure 6:
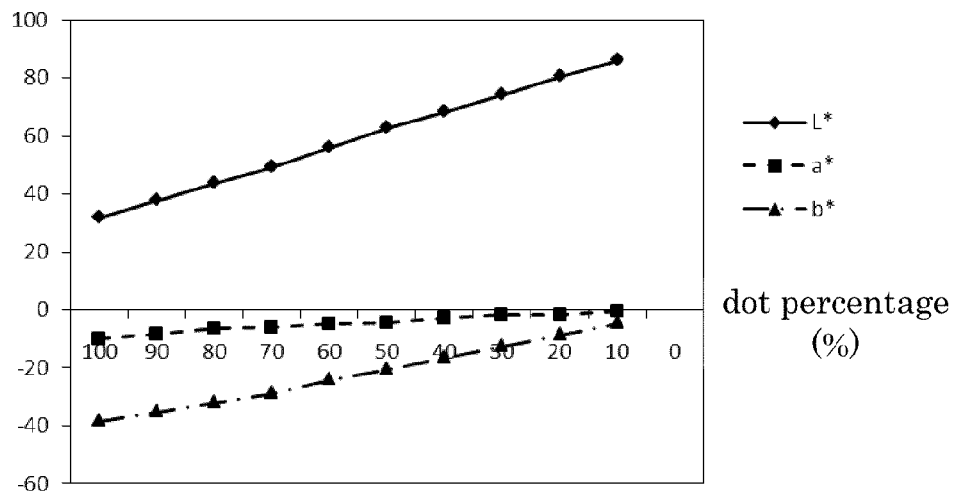
FIG. 6 is a graph showing a relationship between dot percentage and L*a*b* values of the spot color when the spot color is reproduced with the three colors of CMY.
Figure 7:
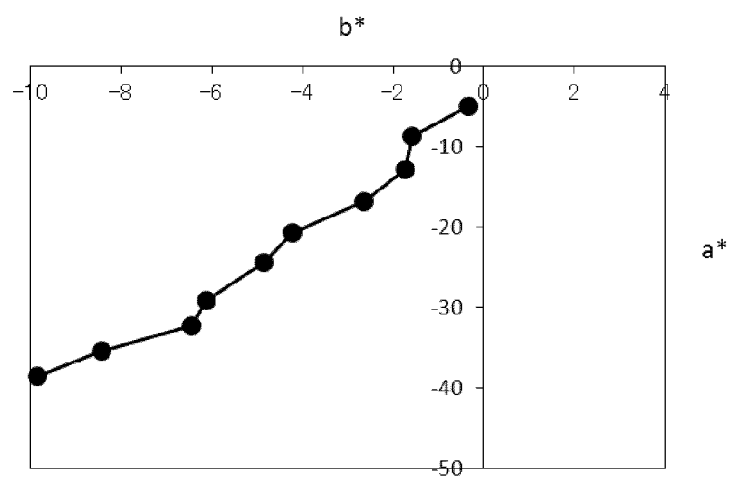
FIG. 7 is a graph showing hue variations in an a*–b* plane with variations in the dot percentage when the spot color is reproduced with the three colors of CMY.
Figure 11:
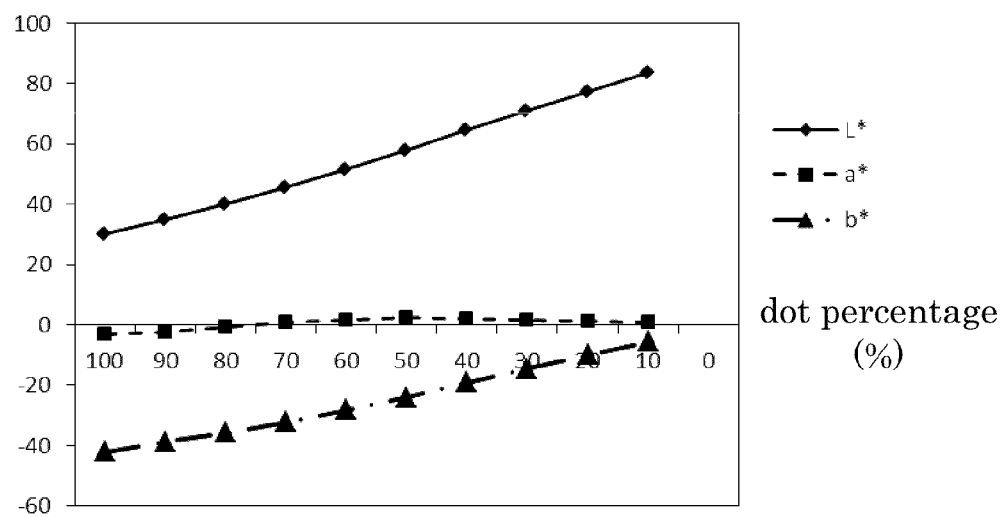
FIG. 11 is a graph showing a relationship between dot percentage and L*a*b* values of a spot color when the spot color is reproduced with the three colors of CMY by a conventional technique.
Figure 12:
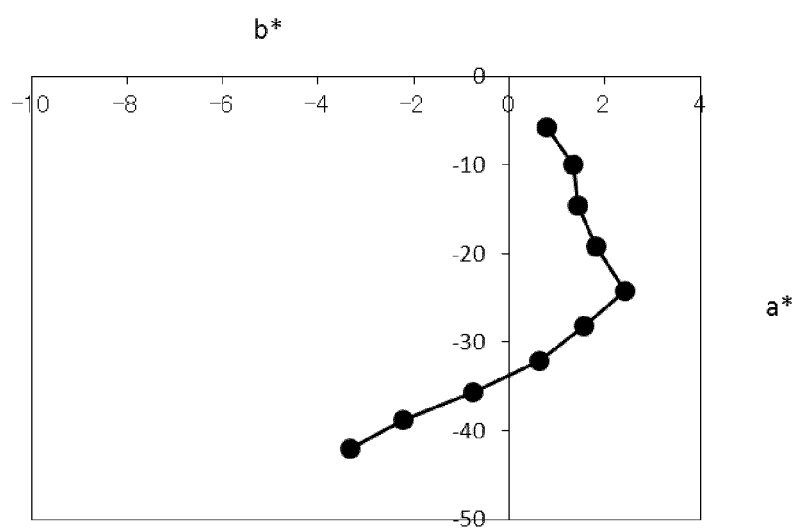
FIG. 12 is a graph showing hue variations in an a*-b* plane occurring with variations in the dot percentage when the spot color is reproduced by the three colors of CMY by the conventional technique.

FIG. 6 is a graph showing a relationship between dot percentage and L*a*b* values of the spot color when the spot color is reproduced with the three colors of CMY. FIG. 7 is a graph showing hue variations in an a*–b* plane occurring with variations in the dot percentage when the spot color is reproduced with the three colors of CMY. These FIGS. 6 and 7 show an example of spot color with CMY= (100, 70, 10) recorded as false color values in the spot color control DB 31. That is, FIGS. 6 and 7 show an example of spot color which can express the closest color with CMY= (100, 70, 10) when a solid of the spot color is separated into CMY as in the conventional example described with reference to FIGS. 11 and 12, and show a plotting of each value occurring when the dot percentage is varied at intervals of 10%.

The first calculating unit 23 calculates the halftone L*a*b* values on the assumption that the L*a*b* values of the spot color vary by equal ratio on the straight line connecting maximum L*a*b* values and minimum L*a*b* values in response to variations in the dot percentage of the spot color as noted above. When the second calculating unit 24 converts the halftone L*a*b* values into halftone CMY (K) values, each value of L*, a* and b*, as shown in FIG. 6, can be said to vary linearly in response to the variations in the dot percentage. On the a*–b* plane, as shown in FIG. 7, it will be seen that the directional property and rate of variations with respect to the variations in the dot percentage have approached the ideal linear variation of hue in the a*–b* plane with respect to the variations of the monochromatic dot percentage shown in FIG. 10.

In the example described above, the L*a*b* values of the spot color are calculated as what varies by equal ratio on the straight line connecting point A and point B in response to variations in the dot percentage of the spot color, but this is not limitative. That is, the halftone L*a*b* values of the spot color may be calculated, for example, with different weights in the ranges of 100 to 80%, 80 to 20% and 20 to 0% dot percentages on an assumption that the L*a*b* values of the spot color vary unequally on the straight line connecting point A and point B in response to variations in the dot percentage of the spot color. Further the line connecting point A and point B in the L*a*b* color space may not necessarily be a straight line. That is, the technique of calculating halftone L*a*b* values in the first calculating unit 23 is to normalize and calculate the L*a*b* values. Various modifications are possible, such as using other normalizing functions, for example.

Figure 8:
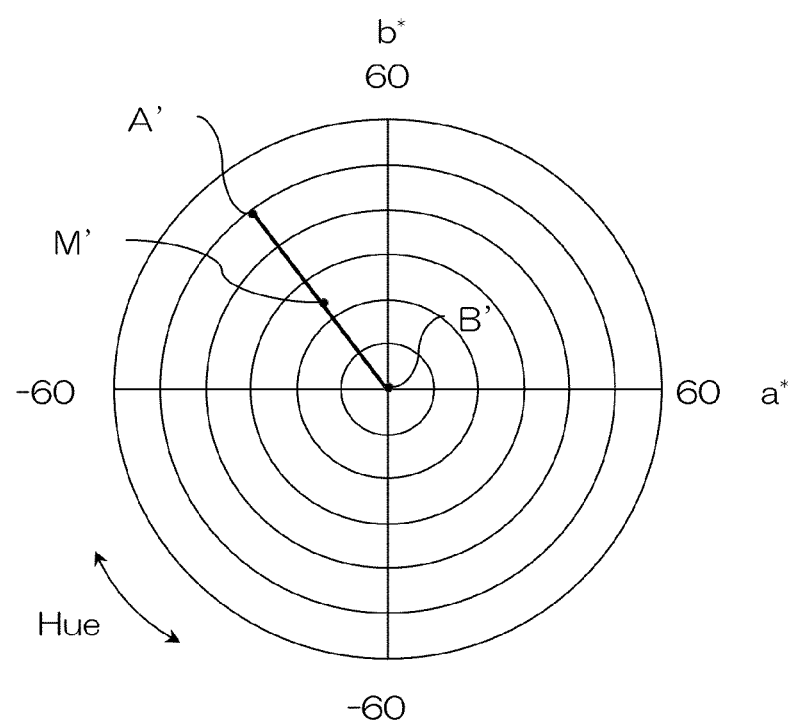
FIG. 8 is an explanatory view of another technique of calculating the halftone L*a*b* values in the first calculating unit.
Figure 9:
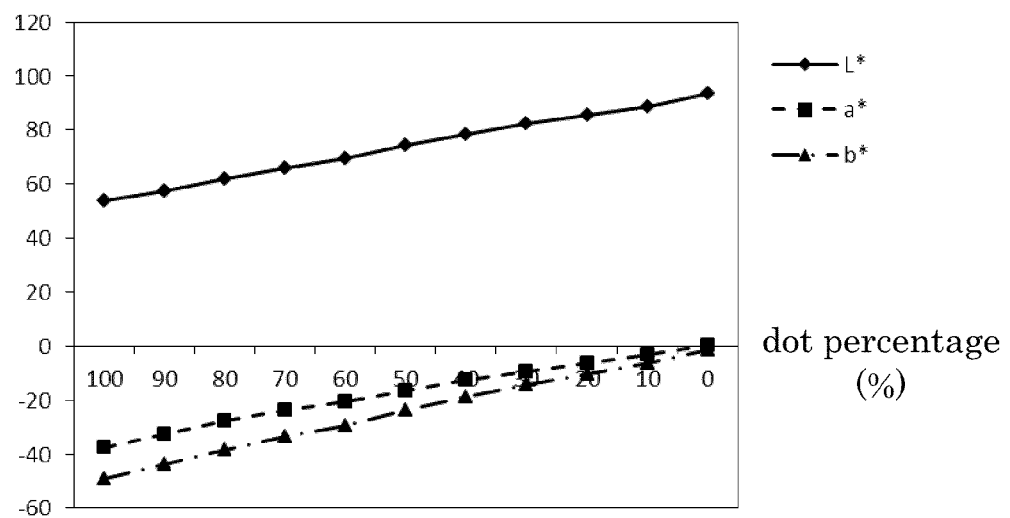
FIG. 9 is a graph showing a relationship between a monochromatic dot percentage and L*a*b* values.

FIG. 8 is an explanatory view of another technique of calculating the halftone L*a*b* values in the first calculating unit 23.

In the example shown in FIG. 5, the maximum L*a*b* values and the minimum L*a*b* values are indicated by point A and point B on the 3D space of L*a*b*, and the halftone L*a*b* values of the spot color are calculated on the assumption that the L*a*b* values of the spot color vary of the line connecting point A and point B in response to variations in the dot percentage of the spot color. In the example of this FIG. 8, on the other hand, the halftone L*a*b* values of the spot color are calculated according to a certain rule represented by a line connecting each a*b* value of the maximum L*a*b* values and minimum L*a*b* values, on the a*–b* plane which is a two-dimensional plane showing hue in an L*a*b* color space.

In FIG. 8, noting that maximum L*a*b* values are L*a*b* =(60, −30, 40) and minimum L*a*b* values are L*a*b*=(100, 0, 0), the respective a*b* values are shown in point A' and point B' on the a*–b* plane, as in FIG. 5. The first calculating unit 23 calculates a*b* values (point M') in the L*a*b* values of the spot color with 50% dot percentage to be a*b*=(−15, 20), on the assumption that the L*a*b* values of the spot color vary by equal ratio on the straight line connecting point A' and point B' on the a*–b* plane in the L*a*b* color space in response to variations in the dot percentage of the spot color.

Figure 10:
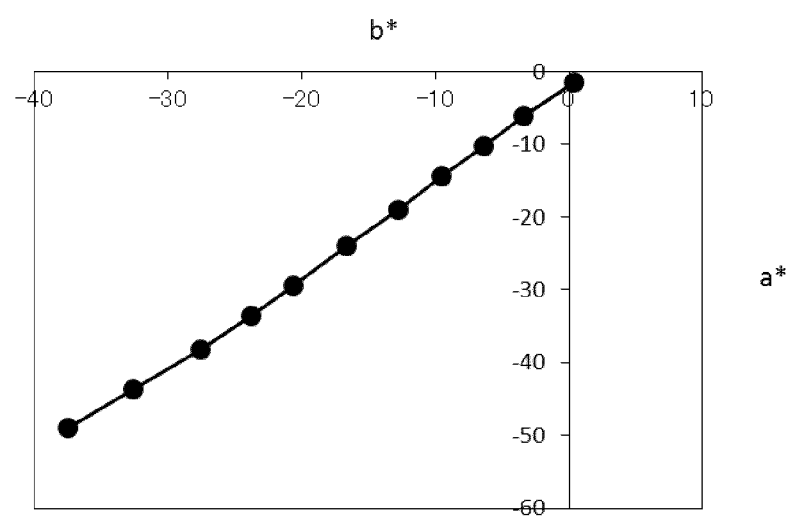
FIG. 10 is a graph showing hue variations in an a*-b* plane occurring with variations in the monochromatic dot percentage.

As described hereinbefore with reference to FIGS. 7 and 10, it is an ideal form in time of excellent color reproduction that hue variations on the a*–b* plane are linear with respect to variations in dot percentage; in other words, the hue variations have a certain constant direction. In the example of FIG. 8, with attention directed particularly to the relationship between variations of dot percentage and variations of hue, the halftone a*b* values are sought on the straight line connecting point A' and point B' on the a*–b* plane. Note that L* value may be obtained as a value variable, with dot percentage, between L* value of maximum L*a*b* values and L* value of minimum L*a*b* values on the L* axis of the L*a*b* color space.

In this way, halftone L*a*b* values can be obtained by separately calculating a*b* values representing chromaticity and L* value representing lightness. It is also possible to use different normalization techniques for calculating a*b* values and for calculating L* value.

In the color conversion of this invention, as described above, halftone L*a*b* values after being calculated are converted into CMYK values. It is therefore possible to reproduce halftone color sense of a spot color with increased accuracy by the colors of color materials used in the printing machine 3.

The foregoing embodiment has been described to exemplify a four process color printing in which the colors of color materials used in the printing machine 3 are CMYK. This invention is applicable also to a case where, for example, to print in bright orange color, a five process color printing is done by adding an orange color ink. Further, while conversion is made to CMYK data by way of example in the color conversion in the foregoing embodiment, this invention is applicable also to conversion to RGB data.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2014-148625 filed in the Japanese Patent Office on Jul. 22, 2014, the entire disclosure of which is incorporated herein by reference.

What is claimed is:

1. A color converting apparatus for converting a device-independent color space into a printing color space dependent on colors of color material loaded in a printing machine, comprising:
    an input port for receiving manuscript data for printing in the printing machine, including data calling for a spot color;
    one or more processors to execute color conversion for printing in which the spot color is reproduced in the printing machine not loaded with the spot color as a color material by using a plurality of other color materials loaded in the printing machine, the one or more processors configured to:
        calculate halftone color values of the spot color in the device-independent color space by connecting with a line, in the device-independent color space, maximum color values of a time when a dot percentage of the spot color is at a maximum, and minimum color values of a time when the dot percentage of the spot color is at a minimum; and
        calculate printing color values in the printing color space from the calculated halftone color values of the spot color in the device-independent color space; and
    an output port for transmitting the printing color values to the printing machine for printing with the color material loaded in the printing machine.

2. The color converting apparatus according to claim 1, wherein:
    the device-independent color space is an L*a*b* color space; and wherein the one or more processors are configured to:
    calculate halftone L*a*b* values of the spot color in the L*a*b* color space by connecting with a line, in the L*a*b* color space, maximum L*a*b* values of a time when a dot percentage of the spot color is at a maximum, and minimum L*a*b* values of a time when the dot percentage of the spot color is at a minimum.

3. The color converting apparatus according to claim 2, wherein:
    the line is a straight line; and wherein the one or more processors are configured to:
    calculate the halftone L*a*b* values of the spot color in the L*a*b* color space on an assumption that the L*a*b* values of the spot color are variable by equal ratio with the dot percentage of the spot color on the line straight line.

4. The color converting apparatus according to claim 2, wherein:
    the line is a straight line; and wherein the one or more processors are configured to:
    calculate the halftone L*a*b* values of the spot color in the L*a*b* color space by on an assumption that the L*a*b* values of the spot color are variable unequally with the dot percentage of the spot color on the straight line.

5. The color converting apparatus according to claim 2, wherein the one or more processors are configured to:
    calculate the halftone L*a*b* values of the spot color in the L*a*b* color space by connecting with a line, in the L*a*b* color space, a*b* values, respectively, of the maximum L*a*b* values and the minimum L*a*b* values on an a*-b* plane on an assumption that the a*b* values of the spot color are variable with the dot percentage of the spot color on the line on the a*-b* plane and L* values of the spit color are variable with the dot percentage of the spot color on an L* axis in the L*a*b* color space.

6. A color converting method for converting a device-independent color space into a printing color space dependent on colors of color material loaded in a printing machine, the method comprising:
    receiving manuscript data for printing in the printing machine, including data calling for a spot color;
    calculating, with one or more processors, halftone color values of the spot color in the device-independent color space by connecting with a line, in the device-independent color space, maximum color values of a time when a dot percentage of the spot color is at a maximum, and minimum color values of a time when the dot percentage of the spot color is at a minimum; and
    calculating, with the one or more processors, printing color values in the printing color space from the calculated halftone color values of the spot color in the device-independent color space;
    transmitting the printing color values to the printing machine for printing with the color material loaded in the printing machine.

* * * * *